«12» United States Patent
Chen et al.

«10» Patent No.: US 9,627,138 B1
«45» Date of Patent: Apr. 18, 2017

«54» APPARATUS AND ASSOCIATED METHODS FOR CAPACITORS WITH IMPROVED DENSITY AND MATCHING

«75» Inventors: Shuxian Chen, Fremont, CA (US);
Albert Ratnakumar, San Jose, CA (US); Yan Cui, Sunnyvale, CA (US);
Jeffrey T. Watt, Palo Alto, CA (US)

«73» Assignee: Altera Corporation, San Jose, CA (US)

« * » Notice: Subject to any disclaimer, the term of this patent is extended or adjusted under 35 U.S.C. 154(b) by 1097 days.

«21» Appl. No.: 13/350,679

«22» Filed: Jan. 13, 2012

«51» Int. Cl.
*H01G 4/005* (2006.01)
*H01G 4/30* (2006.01)
*H01G 4/232* (2006.01)

«52» U.S. Cl.
CPC ............... *H01G 4/30* (2013.01); *H01G 4/232* (2013.01)

«58» Field of Classification Search
CPC .......... H01G 4/30; H01G 4/232; H01G 4/005; H01G 4/10; H01L 28/60
USPC ..... 361/306.3, 304; 257/211, 306, 309, 532, 257/522, 307, 308, 534
See application file for complete search history.

«56» References Cited

U.S. PATENT DOCUMENTS

| 6,057,203 | A | 5/2000 | Wong ........................... 438/381 |
| 6,303,456 | B1 | 10/2001 | Pricer et al. .................. 438/388 |
| 6,765,778 | B1 | 7/2004 | Du et al. ..................... 361/301.4 |
| 6,819,542 | B2* | 11/2004 | Tsai et al. ..................... 361/304 |
| 2012/0092806 | A1* | 4/2012 | Hua et al. .................. 361/306.3 |

OTHER PUBLICATIONS

Aparicio et al., *Capacity Limits and Matching Properties of Integrated Capacitors*, IEEE Journal of Solid-State Circuits, vol. 37, No. 3, Mar. 2002, pp. 384-393.

* cited by examiner

*Primary Examiner* — Robert J Hoffberg
*Assistant Examiner* — Hung Dang

«57» ABSTRACT

Apparatus for integrated capacitors and associated methods are disclosed. In one embodiment, an integrated capacitor includes a first plurality of metal members that are fabricated using a first plurality of metal layers, and are oriented in a first orientation. The integrated capacitor also includes a second plurality of metal members that are fabricated using a second plurality of metal layers. The second plurality of metal members are oriented transverse to the first orientation. The integrated capacitor further includes a third plurality of metal members, which are fabricated using a third plurality of metal layers, and are oriented in the first orientation.

20 Claims, 7 Drawing Sheets

APPARATUS AND ASSOCIATED METHODS FOR CAPACITORS WITH IMPROVED DENSITY AND MATCHING

TECHNICAL FIELD

The disclosed concepts relate generally to electronic circuitry and components and, more particularly, to capacitors with improved characteristics, circuits using such capacitors, and associated methods.

BACKGROUND

Figure 1A:
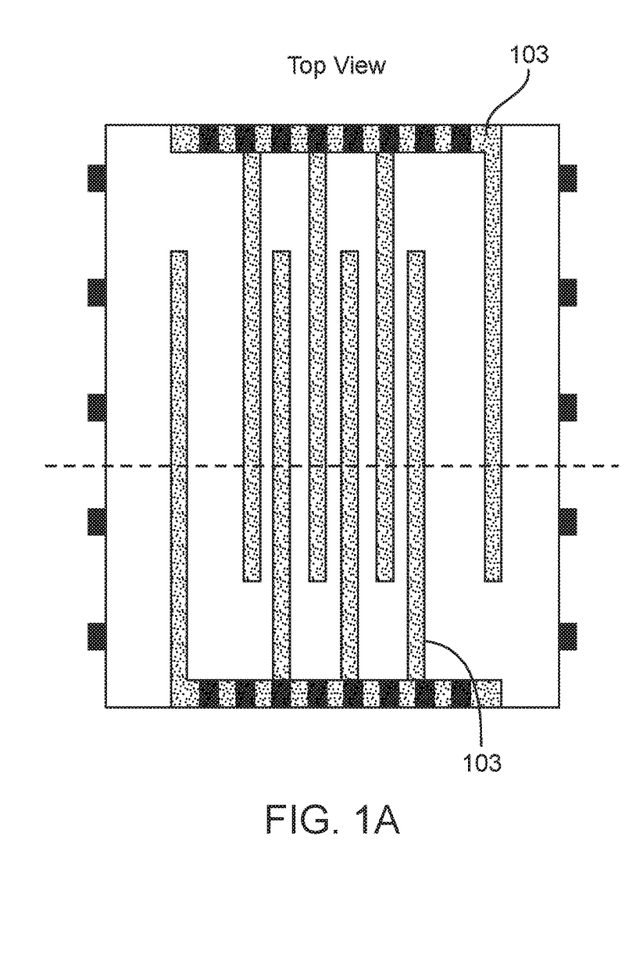
FIGS. 1A-1B and 2A-2B illustrate conventional integrated capacitors.
Figure 1B:
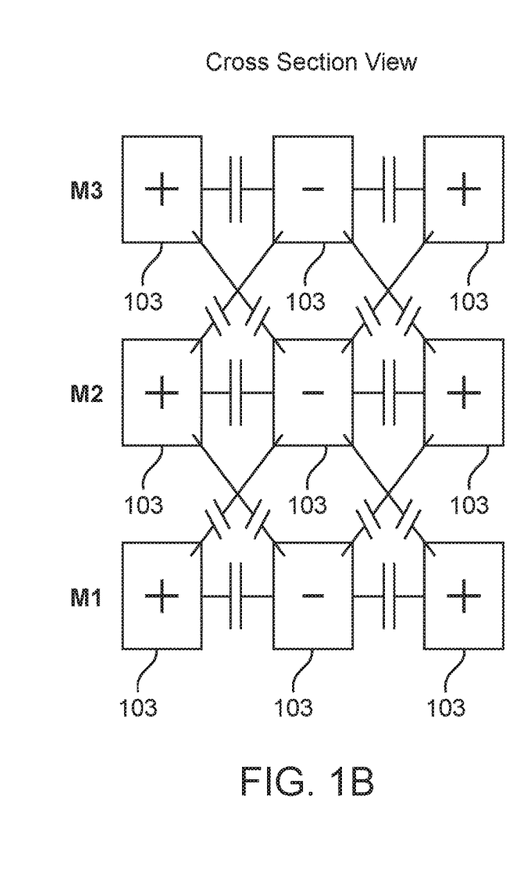

Advances in electronics has allowed increased levels of integration. The technology for fabrication of integrated semiconductor devices has contributed to those advances, and has provided a vehicle for integrating a relatively large number of circuits and devices. Along with active devices, passive devices have also been integrated in semiconductors structures. FIGS. 1A-1B illustrate a conventional integrated capacitor that uses metal segments 103 arranged in three metal layers (M1-M3). FIG. 1B shows a cross section of the metal segments in each metal layer and their biasing pattern. Unlike the capacitor in FIGS. 1A-1B, in another conventional integrated capacitor, vertically stacked metal segments 103 may be biased with a positive-negative-positive or negative-positive-negative pattern.

Figure 2A:
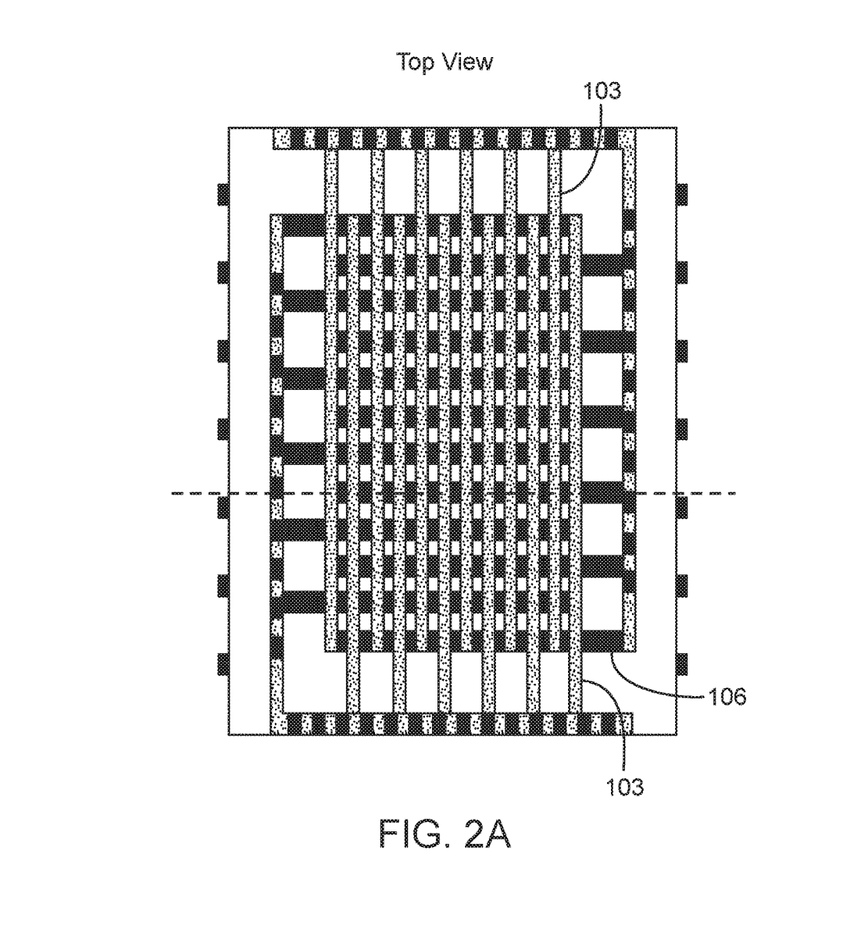
Figure 2B:
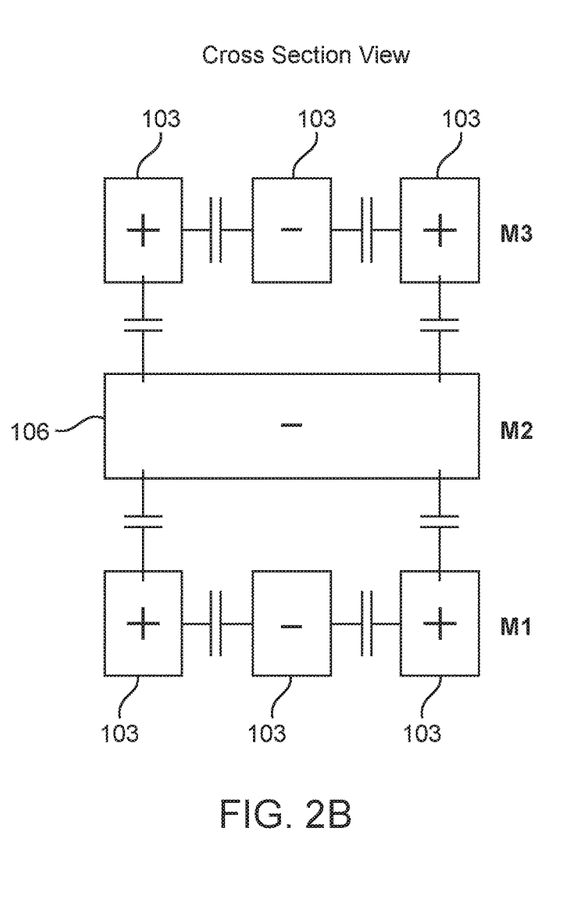

FIGS. 2A-2B show another conventional integrated capacitor. The capacitor uses metal segments 103 (metal layers M1 and M3), which are arranged in a similar manner as the capacitor in FIGS. 1A-1B. In addition, however, the capacitor in FIGS. 2A-2B includes segments members 106 (metal layer M2). Metal segments 106 in metal layer M2 are arranged perpendicularly to metal segments 103 in metal layers M1 and M3, and biased as shown in FIG. 2B.

SUMMARY

Apparatus for integrated capacitors and associated methods are disclosed. In one exemplary embodiment, an integrated capacitor includes a first plurality of metal members that are fabricated using a first plurality of metal layers, and are oriented in a first orientation. The integrated capacitor also includes a second plurality of metal members that are fabricated using a second plurality of metal layers. The second plurality of metal members are oriented transverse to the first orientation. The integrated capacitor further includes a third plurality of metal members, which are fabricated using a third plurality of metal layers, and are oriented in the first orientation.

In another exemplary embodiment, an apparatus includes a first set of metal members that are physically spaced apart from one another, and are oriented in a first orientation. The apparatus also includes a second set of metal members, which are physically spaced apart from one another, and are rotated with respect to the first orientation. The apparatus further includes a third set of metal members that are physically spaced apart from one another, and are oriented in the first orientation.

In yet another exemplary embodiment, a method of fabricating an integrated capacitor includes fabricating a first plurality of metal members in a first orientation. The first plurality of metal members are fabricated using a first plurality of metal layers. The method also includes fabricating a second plurality of metal members in an orientation that is transverse to the first orientation. The second plurality of metal members are fabricated using a second plurality of metal layers. The method further includes fabricating a third plurality of metal members in the first orientation. The third plurality of metal members are fabricated using a third plurality of metal layers.

BRIEF DESCRIPTION OF THE DRAWINGS

The appended drawings illustrate only exemplary embodiments and therefore should not be considered as limiting its scope. Persons of ordinary skill in the art appreciate that the disclosed concepts lend themselves to other equally effective embodiments. In the drawings, the same numeral designators used in more than one drawing denote the same, similar, or equivalent functionality, components, or blocks.

DETAILED DESCRIPTION

The disclosed concepts relate generally to integrated capacitors. Integrated capacitors according to various embodiments provide a number of advantages. First, the disclosed capacitors provide relatively high capacitance density per unit area or volume. Second, the capacitors provide improved planar uniformity (e.g., chemical mechanical polish uniformity) of the layers used to fabricate the capacitors, which reduces or tends to reduce capacitance variations, and reduces capacitor mismatch. As a result, the disclosed capacitors may be matched to each other with a relatively low degree of mismatch. Consequently, the capacitors may be used in applications where good matching of capacitors is desired, as described below in detail.

Figure 3:
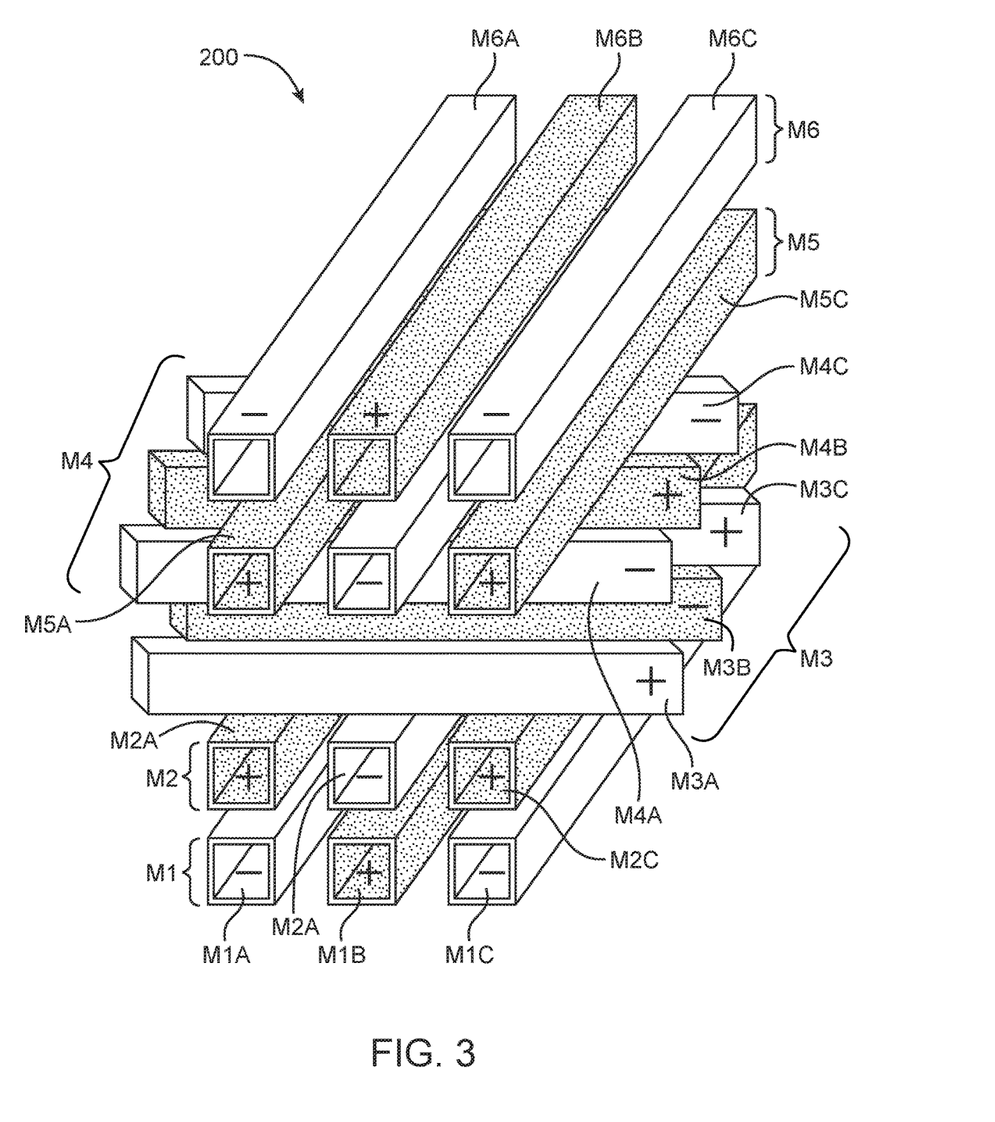
FIG. 3 depicts an isometric or three-dimensional (3D) view of an integrated capacitor according to an exemplary embodiment.

FIG. 3 illustrates an isometric or 3D view of an integrated capacitor 200 according to an exemplary embodiment. In the embodiment shown, capacitor 200 uses metal members (fingers, lines, traces, etc.) fabricated using six metal layers, labeled M1-M6, respectively. The metal members are spaced apart from one another, both laterally or horizontally (with respect to metal members fabricated using a given metal layer) and vertically (metal members fabricated using one metal layer, and metal members fabricated using a metal layer above or below the first metal layer). The spacing between the metal members may be filled with dielectric, as described below in detail.

FIG. 3 also shows the biasing arrangement of the metal members. Note that other biasing arrangements may be used, such as reversing the polarity of the bias applied to the metal members in FIG. 3, etc. Furthermore, note that the final biasing polarity of the metal members may depend on how they (and, ultimately, the integrated capacitor) are coupled to other circuitry and/or sources of bias signals.

Metal layers M1-M6 are progressively fabricated (or arranged or disposed) in a vertical direction, starting with metal layer M1. Thus, metal layer M1 is fabricated (e.g., in or above a substrate, such as a silicon wafer), followed by a layer of dielectric (e.g., silicon dioxide). (FIG. 3 does not show the dielectric layers for the sake of clarity of presentation.) Metal layer M2 is then fabricated above the dielectric layer, followed by metal layer M3, another dielectric layer, metal layer M4, and so on.

Metal layers M1-M6 may include a plurality of metal members, generally fabricated laterally (e.g., in parallel with respect to one another in the plane of the respective metal layer). Thus, as an example, metal members M1A-M1C are fabricated in a coplanar fashion, using metal layer M1. As another example, metal members M3A-M3C are fabricated in a coplanar fashion, using metal layer M3.

In the embodiment shown in FIG. 3, the metal members in metal layers M1 and M2 are fabricated in the same direction. In other words, the metal members in metal layers M1 and M2 are parallel to one another. The metal members in metal layers M3 and M4 are also arranged in the same direction (e.g., parallel with one another).

Moreover, the metal members in metal layers M3 and M4 are arranged a transverse direction relative to the metal members in layers M1 and M2. Thus, in the embodiment shown, the metal members in metal layers M3-M4 are arranged in a direction perpendicular to the direction of the metal members in metal layers M1-M2.

The metal members in metal layers M5 and M6 are arranged in the same direction (e.g., parallel with one another). Moreover, the metal members in metal layers M5 and M6 are arranged a transverse direction relative to the metal members in layers M3 and M4. In the embodiment shown in FIG. 3, the metal members in metal layers M5-M6 are arranged in a direction perpendicular to the direction of the metal members in metal layers M3-M4.

The features of the integrated capacitor (e.g., metal layers, metal members, and dielectric layers of the integrated capacitor) may be fabricated using a number of techniques, as persons of ordinary skill in the art understand. For example, in some embodiments, the features of the integrated capacitor may be fabricated using a masked technique, such as photolithography. As another example, in some embodiments, the features of the integrated capacitor may be fabricated using a maskless technique (e.g., laser ablation, punching, etc.). As yet another example, in some embodiments, the features of the integrated capacitor may be fabricated in part using a masked technique and in part using a maskless technique.

Figure 4:
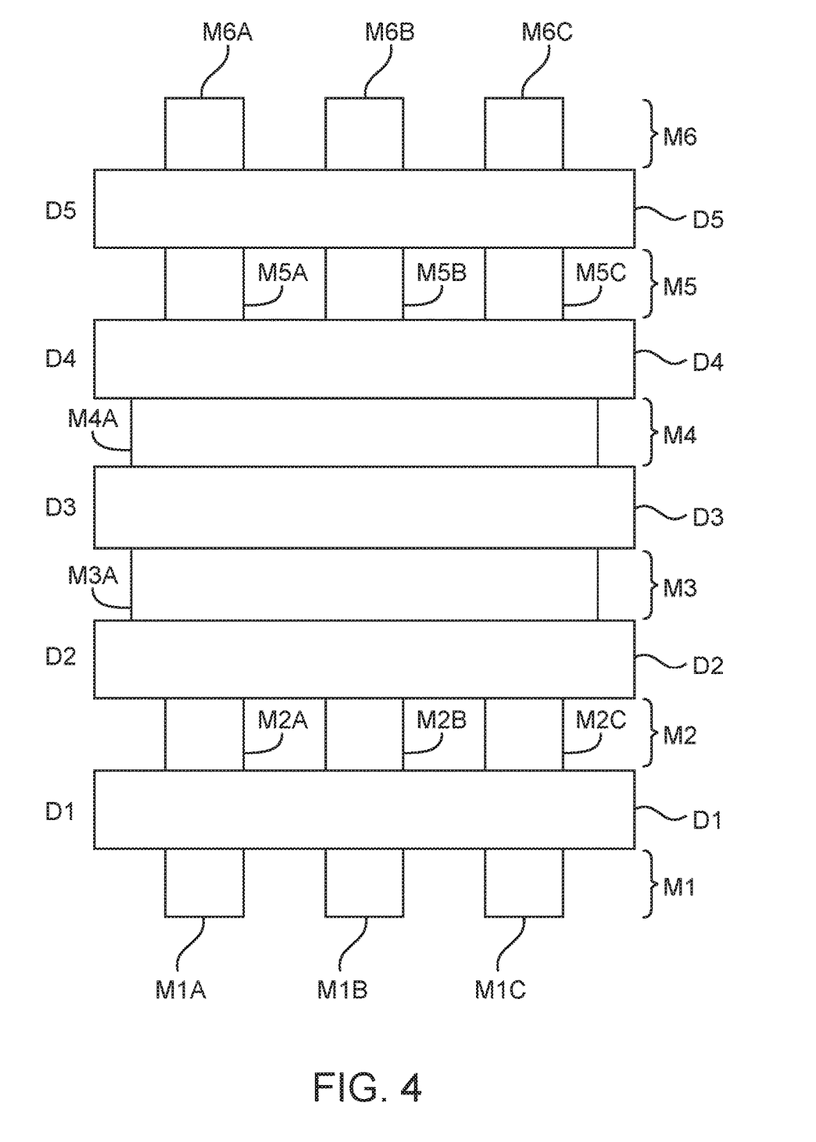
FIG. 4 shows a cross section view of an integrated capacitor according to an exemplary embodiment.

FIG. 4 shows a cross section view of the integrated capacitor of FIG. 3. The metal members of the metal layers are labeled with the metal layer's name and the respective metal member's label. Thus, metal layer M1 includes metal members M1A, M1B, and M1C. As another example, metal layer M6 includes metal members M6A, M6B, and M6C. In the view illustrated, metal members M3B, M3C, M4B, and M4C are not visible.

As noted above, metal members M1A-M1C are fabricated using metal layer M1. Dielectric layer D1 is fabricated above metal members M1A-M1C. During the formation of dielectric layer D1, the space (or void) among metal members M1A-M1C is typically filled with dielectric. Thus, dielectric layer D1 extends to and fills the space between metal members M1A-M1B. Similarly, dielectric layer D1 extends to and fills the space between metal members M1B-M1C.

Metal members M2A-M2C are fabricated above dielectric layer D1, using metal layer M2. Dielectric layer D2 is fabricated above metal members M2A-M2C, followed by metal members M3A-M3C, fabricated using metal layer M3. Dielectric layer D2 extends to and fills the space between metal members M2A-M2B. Similarly, dielectric layer D2 extends to and fills the space between metal members M2B-M2C.

Dielectric layer D3 is fabricated above metal members M3A-M3C. Dielectric layer D3 extends to and fills the space between metal members M3A-M3B. Similarly, dielectric layer D3 extends to and fills the space between metal members M3B-M3C. Metal members M4A-M4C are fabricated above dielectric layer D3, using metal layer M4.

Dielectric layer D4 is fabricated above metal members M4A-M4C. Dielectric layer D4 extends to and fills the space between metal members M4A-M4B. Similarly, dielectric layer D4 extends to and fills the space between metal members M4B-M4C. Metal members M5A-M5C are fabricated above dielectric layer D4, using metal layer M5.

Dielectric layer D5 is fabricated above metal members M5A-M5C. Dielectric layer D5 extends to and fills the space between metal members M5A-M5B. Similarly, dielectric layer D5 extends to and fills the space between metal members M5B-M5C. Metal members M6A-M6C are fabricated above dielectric layer D5, using metal layer M6.

If desired, a dielectric layer (not shown) may be formed above metal members M6A-M6C (e.g., to fill the space between metal members M6A-M6B and between metal members M6B-M6C). Rather than a complete dielectric layer, some dielectric may be formed between metal members M6A and M6B and also between metal members M6B and M6B. In either case, the dielectric separating metal member M6A from metal member M6B, and metal member M6C from metal member M6B, causes the formation of capacitors, as described below in detail.

After the fabrication of one or more of dielectric layers D1-D4, a planarization step may be performed. For example, after the fabrication of dielectric layer D1, a planarization process may be performed to planarize the upper surface of dielectric D1. As another example, after the fabrication of dielectric layer D4, a planarization process may be performed to planarize the upper surface of dielectric D4.

The planarization process may use a variety of techniques, such as chemical mechanical polish (CMP). Fabricating metal members M3A-M3C and M4A-M4C in a direction or orientation that is rotated (e.g., transverse) with respect to the direction or orientation of metal members M1A-M1C and M2A-M2C, and/or metal members M5A-M5C and M6A-M6C (e.g., metal members M3A-M3C are rotated with respect to metal members M2A-M2C, or metal members M4A-M4C are rotated with respect to metal members M2A-M2C (or metal members M1A-M1C)). That particular arrangement of the metal members improves the planarization uniformity, which reduces or tends to reduce capacitance variations among two or more integrated capacitors fabricated using the disclosed techniques.

In some applications, reduced capacitance variations provides advantages. More specifically, in some circuit applications, the absolute value of the capacitance of two or more capacitors may affect the performance of the circuit. In such applications, a reduction in capacitance variations between the two or more capacitors results in improved performance of the circuit.

In other applications, the ratio of the capacitance of two or more capacitors may affect the performance of the circuit. In those applications, a reduction in capacitance variations between the two or more capacitors results in less variation in the ratio of the capacitors and, hence, improved performance of the circuit.

Figure 5:
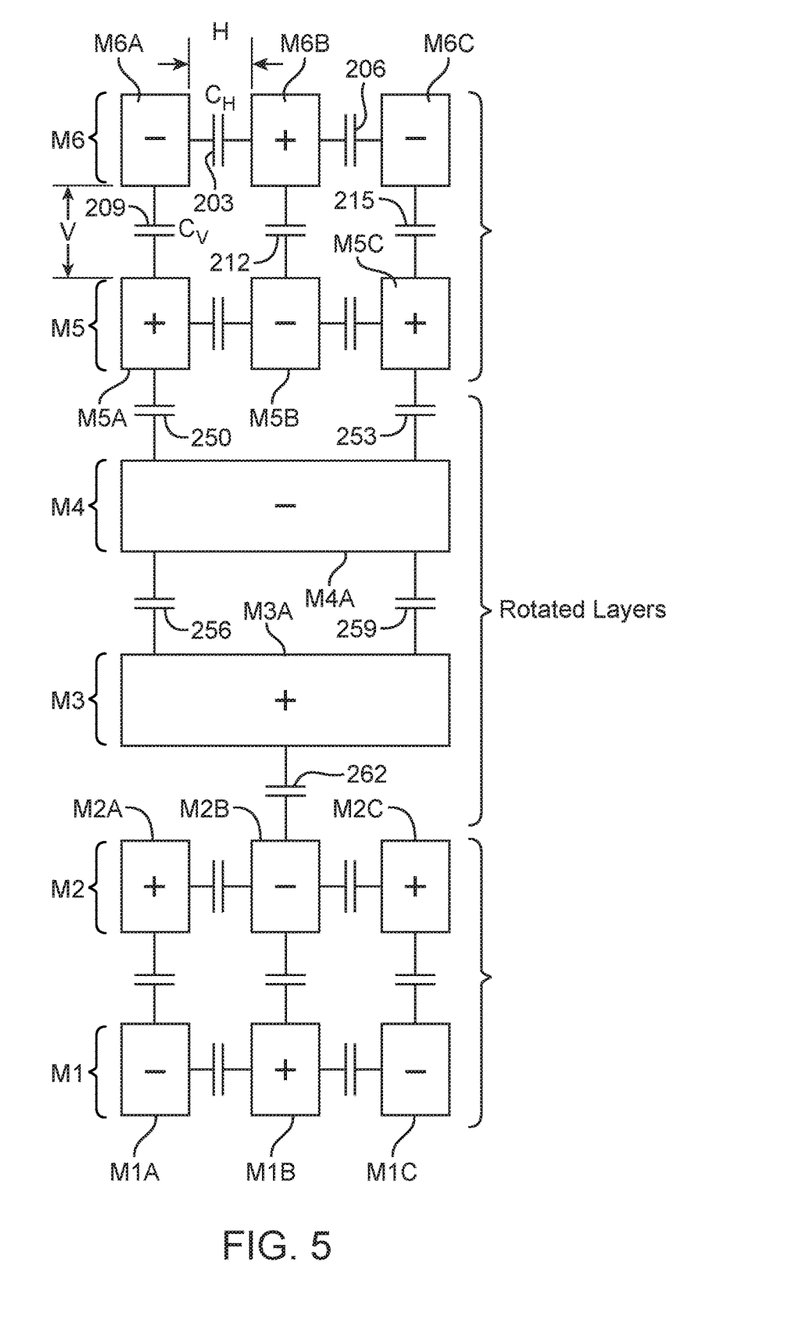
FIG. 5 depicts a biasing arrangement of an integrated capacitor according to an exemplary embodiment.

FIG. 5 depicts a biasing arrangement of an integrated capacitor according to an exemplary embodiment. Specifically, FIG. 5 shows an example of how the metal members of the integrated capacitor of FIG. 3 may be biased. Within a metal layer, the metal members are biased with alternate bias polarities. For example, metal member M6A is biased with a negative voltage, whereas neighboring metal member M6B is biased with a positive voltage. Similarly, metal member M6C is biased with a negative voltage, i.e., an alternate bias polarity with respect to metal member M6B. Thus, metal members fabricated using the same metal layer have differing or opposite bias polarities.

In the embodiment shown, the same or a similar biasing arrangement applies to the rotated or transverse metal layers, i.e., metal layers M3 and M4. Thus, for example, metal member M4A is biased with a negative voltage, whereas neighboring metal member M4B is biased with a positive voltage. Similarly, metal member M4C is biased with a negative voltage, i.e., an alternate bias polarity with respect to metal member M4B. Thus, metal members fabricated using the same metal layer have differing or opposite bias polarities.

A similar biasing arrangement applies between metal members that have the same direction or orientation. More specifically, a metal member fabricated in a given metal layer has a differing (or alternate or opposite) bias polarity than do the corresponding metal members fabricated in the metal layer above (or below). For example, consider metal layers M1 and M2. Metal member M1A (fabricated using metal layer M1) is biased with a negative voltage, whereas metal member M2A (fabricated using metal layer M2, which is above metal layer M1) has an opposite bias voltage (positive).

As another example, consider metal layers M4 and M3. (FIG. 3 shows an example of the biasing arrangement for metal layers M3 and M4.) Metal member M4A (fabricated using metal layer M4) is biased with a negative voltage, whereas metal member M3A (fabricated using metal layer M3, which is below metal layer M4) has an opposite bias voltage (positive).

FIG. 5 also shows the capacitors formed between various metal members. As persons of ordinary skill in the art understand, two conductors, separated by a dielectric, form a capacitor. If the conductors are biased with opposite polarities (e.g., one conductor coupled to a voltage that is positive with respect to a voltage coupled to another conductor), the capacitor charges. By using the techniques described above, a number of capacitors are formed between metal members fabricated using a given metal layer. In addition, capacitors are formed between metal members fabricated using two respective metal layers.

For example, in FIG. 5, metal member M6A is separated by dielectric layer D5 from metal member M5A (FIG. 4 shows this feature explicitly). Furthermore, metal members M6A and M5A are biased, respectively, negative and positive. Thus, a capacitor 209 forms between metal members M6A and M5A. Similar capacitors form between metal fingers M6B and M5B (capacitor 212) and between metal fingers M6C and M5C (capacitor 215).

As another example, metal member M6A is separated by dielectric (not shown explicitly) from metal member M6B. Metal members M6A and M6B are biased, respectively, negative and positive. Consequently, a capacitor 203 forms between metal members M6A and M6B. Similar capacitors form between metal members M6B and M6C (capacitor 206), between metal members M5A and M5B, between metal members M2A and M2B, between metal members M1B and M1C, etc.

Note that metal members M4A and M3A have opposite bias voltages, and are separated by dielectric. Thus, capacitors 256 and 259 (or a capacitor that represents both) form between metal members M4A and M3A. Similar capacitors form between metal members M4A and M5A (capacitor 250), between metal members M4A and M5C (capacitor 253), between metal members M3A and M2B, etc.

Some metal members, even though separated by dielectric, have the same bias (e.g., same polarity voltage). A capacitor does not form between such metal members. For example, metal members M5B and M4A have the same bias (same polarity voltage). As another example, metal members M3A and M2A, or metal members M3A and M2C, have the same bias.

One group of the metal members that have the same bias (e.g., same polarity voltage) applied to them are typically coupled to one another, and form one electrode or terminal of the integrated capacitor. Another group of metal members that have the opposite bias (e.g., a differing voltage, an opposite polarity voltage) of the first group of metal members applied to them are typically coupled to one another, and form the other electrode or terminal of the integrated capacitor.

Referring to FIG. 5, for example, metal members M1A, M1C, M2B, M4A, M5B, M6A, and M6C have the same bias (negative) applied to them, and therefore form one electrode or terminal of the integrated capacitor. Furthermore, metal members M1B, M2A, M2C, M3A, M5A, M5C, and M6B have the same bias (positive, which is the opposite of the preceding group of metal members) applied to them, and therefore form one electrode or terminal of the integrated capacitor of FIG. 5.

Figure 6:
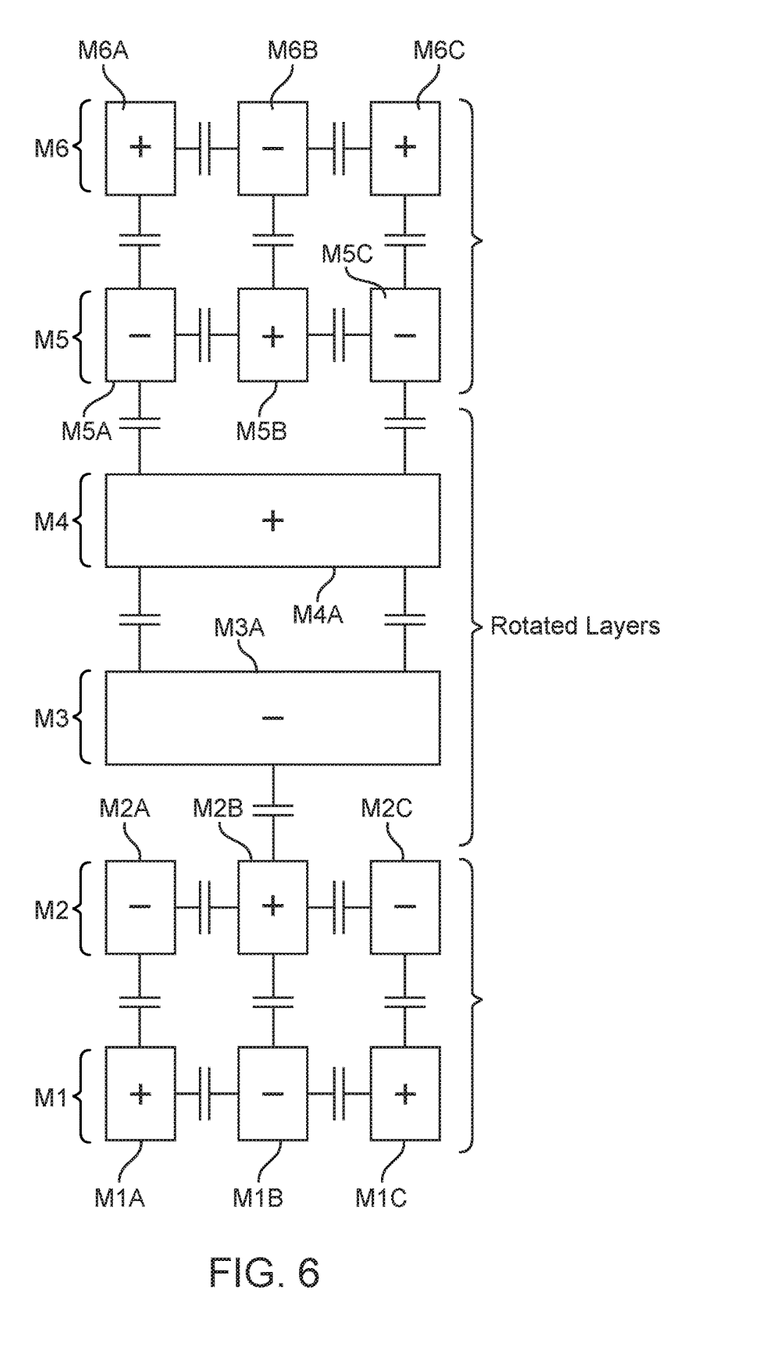
FIG. 6 illustrates a biasing arrangement of an integrated capacitor according to another exemplary embodiment.

Note that a variety of biasing schemes are possible, depending on factors such as desired capacitance, available metal layers, metal member density, etc. As merely one example, an alternative biasing scheme may be obtained by reversing the bias polarities of the metal members of the integrated capacitor in FIG. 5. FIG. 6 shows an integrated capacitor having such as biasing scheme. Thus, M6A has a negative bias in FIG. 5, but a positive bias in FIG. 6; M6B has a positive bias in FIG. 5, but a negative bias in FIG. 6; and so on.

Although the exemplary embodiments illustrated and described have three metal members per metal layer, other numbers and arrangements of metal members may be used, as persons of ordinary skill in the art understand. The choice of the number of metal members depends on factors such as desired overall capacitance, available area (e.g., area on a semiconductor die that one may allocate to a given integrated capacitor), etc., as persons of ordinary skill in the art understand. Generally speaking, increasing the number of metal members per metal layer allows fabricating integrated capacitors with larger overall capacitance.

Similarly, although the exemplary embodiments illustrated and described are fabricated using six metal layers, other numbers and arrangements of metal layers may be used, as persons of ordinary skill in the art understand. The choice of number of metal layers depends on factors such as desired overall capacitance, available fabrication technology (e.g., how many overall metal layers are available), etc., as persons of ordinary skill in the art understand.

Referring to FIG. 5, generally speaking, in a given implementation, the horizontal or lateral spacing between the metal members, shown as H in FIG. 5, may be made smaller than the spacing between the metal layers, shown as V in the figure. In other words, metal members may be fabricated with a smaller spacing to each other (e.g., the spacing between metal members M6A and M6B) compared to the spacing between a metal layer and a metal layer above or below it. As a result, larger capacitance values may be more readily accommodated by increasing the number of metal members fabricated using a metal layer, rather than increasing the number of metal layers.

Note that, although the description of the exemplary embodiments refers to metal layers and metal members, other materials may be used instead of metal, as persons of ordinary skill in the art understand. For example, in some embodiments, semiconductor material, for example, doped silicon, or polysilicon may be used to fabricate the members for the integrated capacitors.

Furthermore, the exemplary embodiment of an integrated capacitor in FIG. 3 shows metal members M3A-M3C and M4A-M4C as having an orientation or direction that is transverse or nearly or substantially transverse (e.g., a few degrees less than or more than 90 degrees because of, for example, fabrication tolerances) to the orientation or direction of metal members M1A-M1C, M2A-M2C, M5A-M5C, and M6A-M6C. As persons of ordinary skill in the art understand, however, other arrangements may be used.

Generally, metal members M3A-M3C and M4A-M4C are rotated with respect to metal members M1A-M1C, M2A-M2C, M5A-M5C, and M6A-M6C. As a result, an angle forms between the respective orientations of metal members M3A-M3C and M4A-M4C on the one hand, and metal members M1A-M1C, M2A-M2C, M5A-M5C, and M6A-M6C on the other hand.

In some embodiments, the angle, which corresponds to the degree of rotation of metal members M3A-M3C and M4A-M4C with respect to metal members M1A-M1C, M2A-M2C, M5A-M5C, and M6A-M6C, may have values other than 90 degrees (or nearly or substantially 90 degrees). Generally speaking, the angle may have values between zero and 90 degrees. For example, the angle may have values of, say, 25 degrees, 45 degrees, or 75 degrees in various exemplary embodiments.

As noted above, integrated capacitors according to exemplary embodiments provide improved capacitance uniformity and reduced capacitance variation. Such capacitors may prove advantageous in a variety of electronic devices, such as integrated circuits (IC), that include circuitry that may be sensitive to capacitance variations and/or may benefit from reduced capacitance variations.

Figure 7:
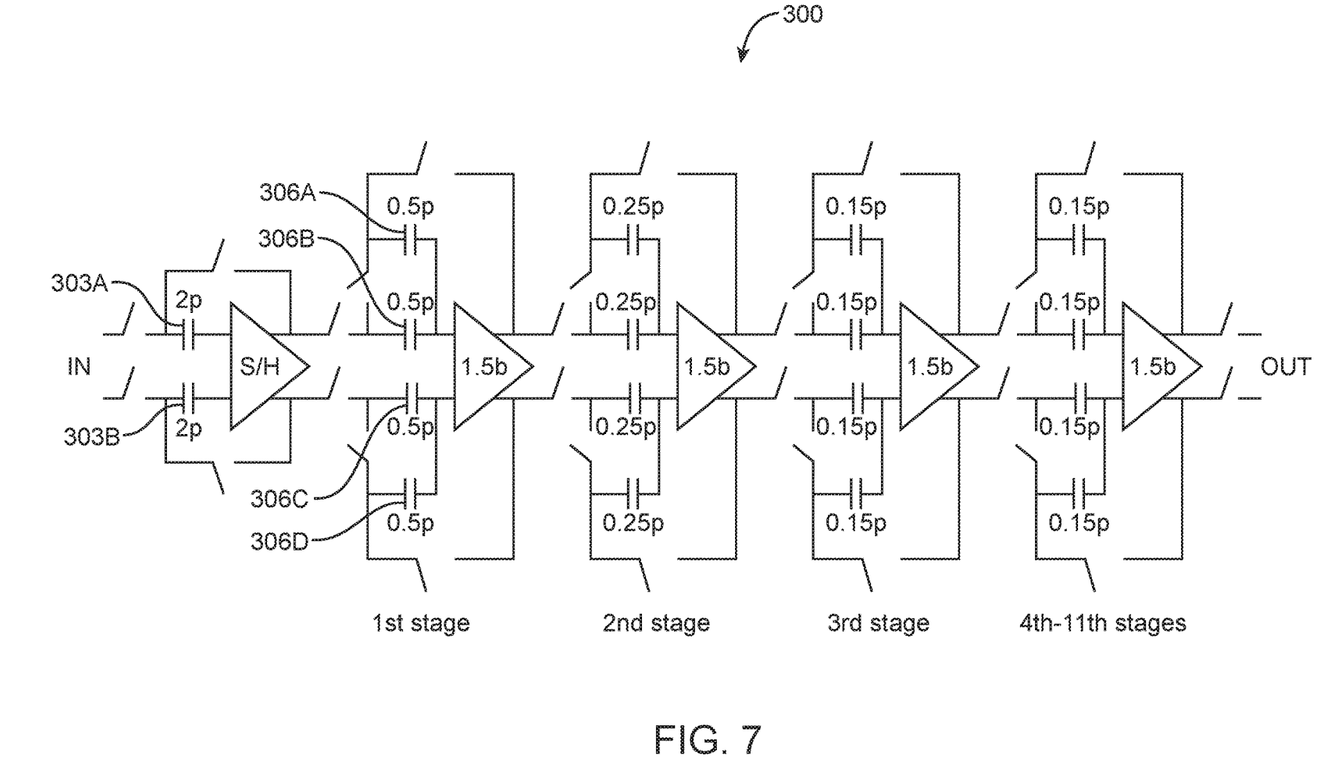
FIG. 7 depicts an analog to digital converter (ADC) according to an exemplary embodiment.

Examples of such circuitry include ADCs, digital to analog converters (DACs), sample and hold circuits, filters (e.g., switched capacitor filters), charge coupled devices (CCDs), and the like. As merely one example, FIG. 7 depicts an ADC 300 according to an exemplary embodiment.

The topology and operation of ADC 300 is well known by persons of ordinary skill in the art. Briefly, ADC 300 is a 14-bit pipelined ADC, which incorporates a sample and hold stage that uses a pair of matched capacitors 303A-303B. The sample and hold stage is followed by 11 stages that include an arrangement of amplifiers and matched capacitors to provide the analog to digital conversion.

The sample and hold stage capacitor, i.e., capacitors 303A-303B, have a value of 2 pF. The first stage following the sample and hold stage uses capacitors 306A-306B, with a value of 0.5 pF. Assuming a one volt signal swing, the 14-bit resolution of ADC 300 results in a specified capacitance mismatch of $1/2^{14}$, or 0.006%. For 0.5 pF capacitors, the specified mismatch is 0.03 fF.

Stage two following the sample and hold stage uses 0.25 pF capacitors. Stages three through 11 use 0.15 pF capacitors, which leads to even smaller capacitor mismatch values than for the first stage. By using integrated capacitors according to various embodiments, the capacitor mismatch or variation may be reduced or improved, which results in better operation of ADC 300. Similar results may be accomplished in other circuits and devices, as persons of ordinary skill in the art understand.

Referring to the figures, persons of ordinary skill in the art will note that the various blocks shown might depict mainly the conceptual functions and signal flow. The actual circuit implementation might or might not contain separately identifiable hardware for the various functional blocks and might or might not use the particular circuitry shown. For example, one may combine the functionality of various blocks into one circuit block, as desired. Furthermore, one may realize the functionality of a single block in several circuit blocks, as desired. The choice of circuit implementation depends on various factors, such as particular design and performance specifications for a given implementation. Other modifications and alternative embodiments in addition to those described here will be apparent to persons of ordinary skill in the art. Accordingly, this description teaches those skilled in the art the manner of carrying out the disclosed concepts, and is to be construed as illustrative only.

The forms and embodiments shown and described should be taken as illustrative embodiments. Persons skilled in the art may make various changes in the shape, size and arrangement of parts without departing from the scope of the disclosed concepts in this document. For example, persons skilled in the art may substitute equivalent elements for the elements illustrated and described here. Moreover, persons skilled in the art may use certain features of the disclosed concepts independently of the use of other features, without departing from the scope of the disclosed concepts.

The invention claimed is:

1. An integrated capacitor comprising:
   a first plurality of metal members, fabricated using a first plurality of adjacent stacked metal layers, and oriented in a first orientation;
   a second plurality of metal members fabricated using a second plurality of adjacent stacked metal layers, the second plurality of metal members oriented transverse to the first orientation; and
   a third plurality of metal members, fabricated using a third plurality of adjacent stacked metal layers, and oriented in the first orientation.

2. The integrated capacitor according to claim 1, wherein the first plurality of metal members are separated from the second plurality of metal members by dielectric.

3. The integrated capacitor according to claim 2, wherein the second plurality of metal members are separated from the third plurality of metal members by dielectric.

4. The integrated capacitor according to claim 1, wherein the metal members in the first plurality of metal members are separated from one another by dielectric.

5. The integrated capacitor according to claim 4, wherein the metal members in the second plurality of metal members are separated from one another by dielectric.

6. The integrated capacitor according to claim 5, wherein the metal members in the third plurality of metal members are separated from one another by dielectric.

7. The integrated capacitor according to claim 6, wherein the dielectric comprises silicon dioxide.

8. The integrated capacitor according to claim 1, wherein:
alternating metal members corresponding to a metal layer in the first plurality of metal members are coupled together;
alternating metal members corresponding to a metal layer in the second plurality of metal members are coupled together; and
alternating metal members corresponding to a metal layer in the third plurality of metal members are coupled together.

9. An apparatus comprising:
a first set of metal members, physically spaced apart from one another, and oriented in a first orientation;
a second set of metal members, physically spaced apart from one another, and rotated with respect to the first orientation;
a third set of metal members, physically spaced apart from one another, and oriented in the first orientation,
wherein the first set of metal members is fabricated using a first set of adjacent stacked metal layers; the second set of metal members is fabricated using a second set of adjacent stacked metal layers; and the third set of metal members is fabricated using a third set of adjacent stacked metal layers.

10. The apparatus according to claim 9, wherein the second set of metal members is rotated substantially 90 degrees with respect to the first orientation.

11. The apparatus according to claim 9, wherein the second set of metal members is rotated with respect to the first orientation by an angle between 25 and 75 degrees.

12. The apparatus according to claim 9, wherein the first set of metal members is separated from the second set of metal members by dielectric; and the second set of metal members is separated from the third set of metal members by dielectric.

13. The apparatus according to claim 9, wherein the first orientation is substantially perpendicular to the second orientation.

14. The apparatus according to claim 9, wherein the first set of metal layers comprises two metal layers; the second set of metal layers comprises two metal layers; and the third set of metal layers comprises two metal layers.

15. The apparatus according to claim 9, wherein the first, second, and third set of metal members form an integrated capacitor, wherein the integrated capacitor is coupled to analog to digital converter circuitry, digital to analog converter circuitry, filter circuitry, or sample and hold circuitry.

16. A method of fabricating an integrated capacitor, the method comprising:
fabricating a first plurality of metal members in a first orientation, the first plurality of metal members fabricated using a first plurality of adjacent stacked metal layers;
fabricating a second plurality of metal members in an orientation transverse to the first orientation, the second plurality of metal members fabricated using a second plurality of adjacent stacked metal layers; and
fabricating a third plurality of metal members in the first orientation, the third plurality of metal members fabricated using a third plurality of adjacent stacked metal layers.

17. The method according to claim 16, further comprising:
coupling together alternating metal members corresponding to a metal layer in the first plurality of metal members;
coupling together alternating metal members corresponding to a metal layer in the second plurality of metal members; and
coupling together alternating metal members corresponding to a metal layer in the first plurality of metal members.

18. The method according to claim 16, further comprising:
fabricating dielectric between metal members in the first plurality of metal members;
fabricating dielectric between metal members in the second plurality of metal members; and
fabricating dielectric between metal members in the third plurality of metal members.

19. The method according to claim 18, further comprising:
fabricating dielectric between metal members in the first plurality of metal members and metal members in the second plurality of metal members; and
fabricating dielectric between metal members in the second plurality of metal members and metal members in the third plurality of metal members.

20. The method according to claim 19, further comprising planarizing the dielectric formed between metal members in the first plurality of metal members and metal members in the second plurality of metal members, and/or planarizing the dielectric formed between metal members in the second plurality of metal members and metal members in the third plurality of metal members.

* * * * *